(12) United States Patent
Weissman

(10) Patent No.: US 8,680,438 B2
(45) Date of Patent: Mar. 25, 2014

(54) COMBINATION URN AND WARMING PLATE AND METHODS OF USING SAME

(75) Inventor: Herbert S. Weissman, Brooklyn, NY (US)

(73) Assignee: Fundways Ltd., Cedarhurst, NY (US)

( * ) Notice: Subject to any disclaimer, the term of this patent is extended or adjusted under 35 U.S.C. 154(b) by 162 days.

(21) Appl. No.: 12/873,472

(22) Filed: Sep. 1, 2010

(65) Prior Publication Data

US 2011/0049126 A1 Mar. 3, 2011

Related U.S. Application Data

(60) Provisional application No. 61/239,119, filed on Sep. 2, 2009.

(51) Int. Cl.
*A47J 36/24* (2006.01)

(52) U.S. Cl.
USPC ........... 219/386; 219/385; 219/438; 219/439; 219/443.1; 219/446.1

(58) Field of Classification Search
None
See application file for complete search history.

(56) References Cited

U.S. PATENT DOCUMENTS

| | | | | |
|---|---|---|---|---|
| 1,672,742 | A * | 6/1928 | Williamson | 126/348 |
| 3,325,058 | A * | 6/1967 | West, Jr. | 222/146.5 |
| 3,432,642 | A * | 3/1969 | Lohr et al. | 219/439 |
| 3,609,297 | A * | 9/1971 | Christopoulos | 219/439 |
| 3,859,505 | A * | 1/1975 | Herbrand et al. | 219/433 |
| 4,897,525 | A * | 1/1990 | Hirsch | 219/401 |
| 4,919,109 | A * | 4/1990 | Riley | 126/9 R |
| 5,539,185 | A * | 7/1996 | Polster | 219/439 |
| 6,705,210 | B2 * | 3/2004 | Leonard | 99/413 |
| 7,288,745 | B2 * | 10/2007 | Colonna | 219/439 |
| 2006/0288997 | A1 * | 12/2006 | Griffin | 126/33 |

FOREIGN PATENT DOCUMENTS

GB 235341 A1 6/1925
IL 207931 3/2011

OTHER PUBLICATIONS

Office Action of the Israel Patent office, Aug. 7, 2012, Application No. 207931.

* cited by examiner

*Primary Examiner* — Joseph M Pelham
(74) *Attorney, Agent, or Firm* — Dr. Hanan Farber Patent Agent Ltd.

(57) ABSTRACT

The present invention generally concerns a Combination Urn and Hot Plate for supplying heat to both liquids and solids, typically beverages and food, for heating or keeping same warm.

4 Claims, 5 Drawing Sheets

COMBINATION URN AND WARMING PLATE AND METHODS OF USING SAME

PRIORITY INFORMATION

This application claims priority from U.S. Provisional Patent Application Ser. No. 61/239,119, filed Sep. 2, 2009, which is hereby incorporated in its entirety by reference herein.

FIELD OF THE INVENTION

The present invention generally concerns a Combination Urn and Hot Plate for heating up and keeping water, tea, coffee or other beverages hot while simultaneously warming up or keeping food warm or hot.

BACKGROUND OF THE INVENTION

Hot water dispensers, including urns, samovars and the like are well known, and in the past few decades these have been electrified. They are used for providing a ready supply of hot water. Food warming plates, otherwise known as hot plates, are also known. These warm up food and/or keep food warm. Many hot plates dry out food left thereupon and, if too hot, can result in food burning. Whether used in domestic or commercial establishments, the presence of both an urn and a hot plate takes up space, and both consume energy.

SUMMARY OF THE INVENTION

The present invention concerns a Combination Urn and Hot Plate for keeping providing heat to both solids and liquids, to heat same, or to keep them hot.

BRIEF DESCRIPTION OF THE DRAWINGS

The following figures are by way of illustrative example and are not meant to be taken as limiting the claimed invention.

DETAILED DESCRIPTION OF THE EMBODIMENTS

Figure 1:
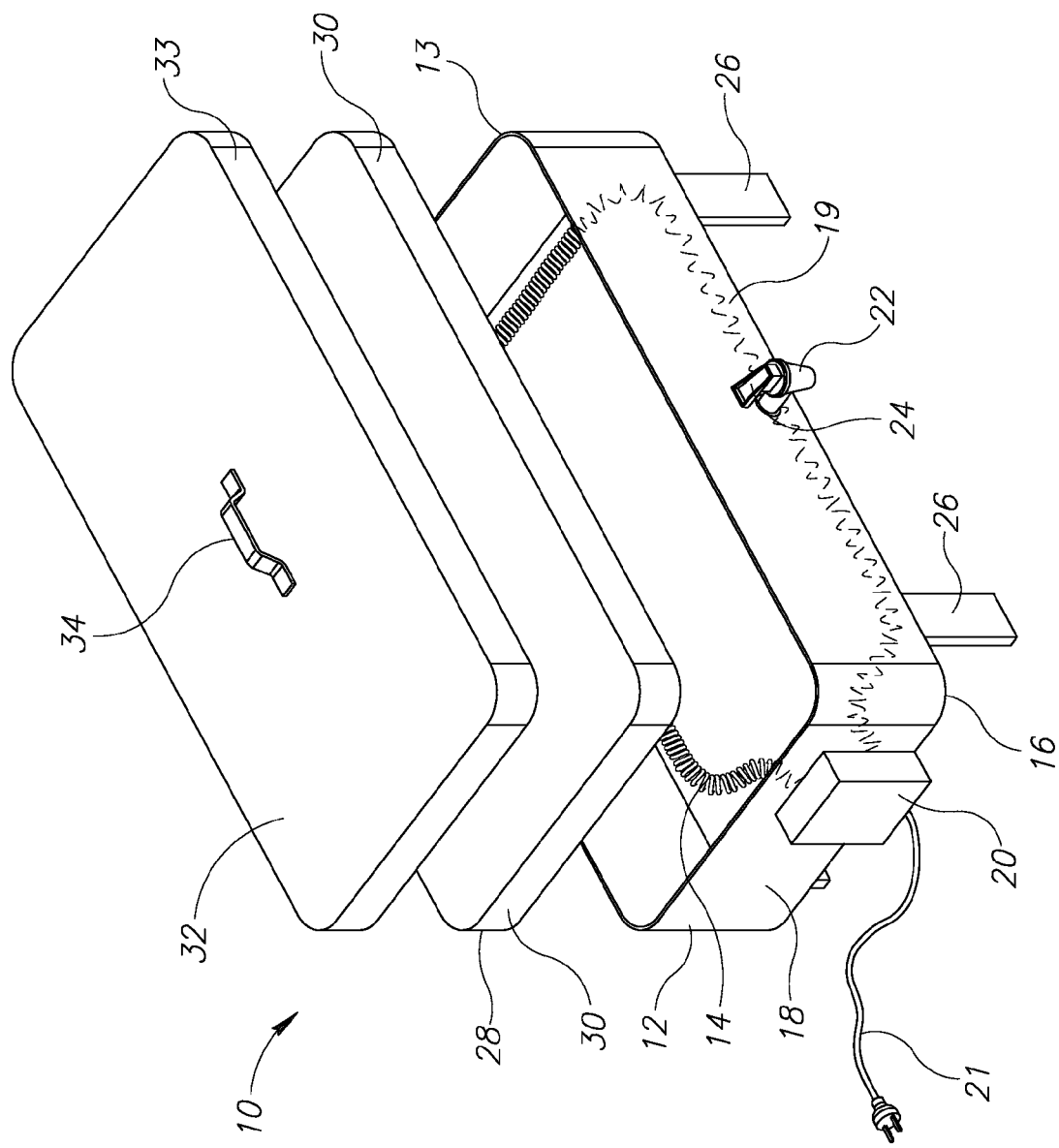
FIG. 1 is an exploded isometric projection of a Combination Urn and Hot Plate, with a heating coil contained within the urn part, in accordance with an embodiment of the invention.
Figure 2:
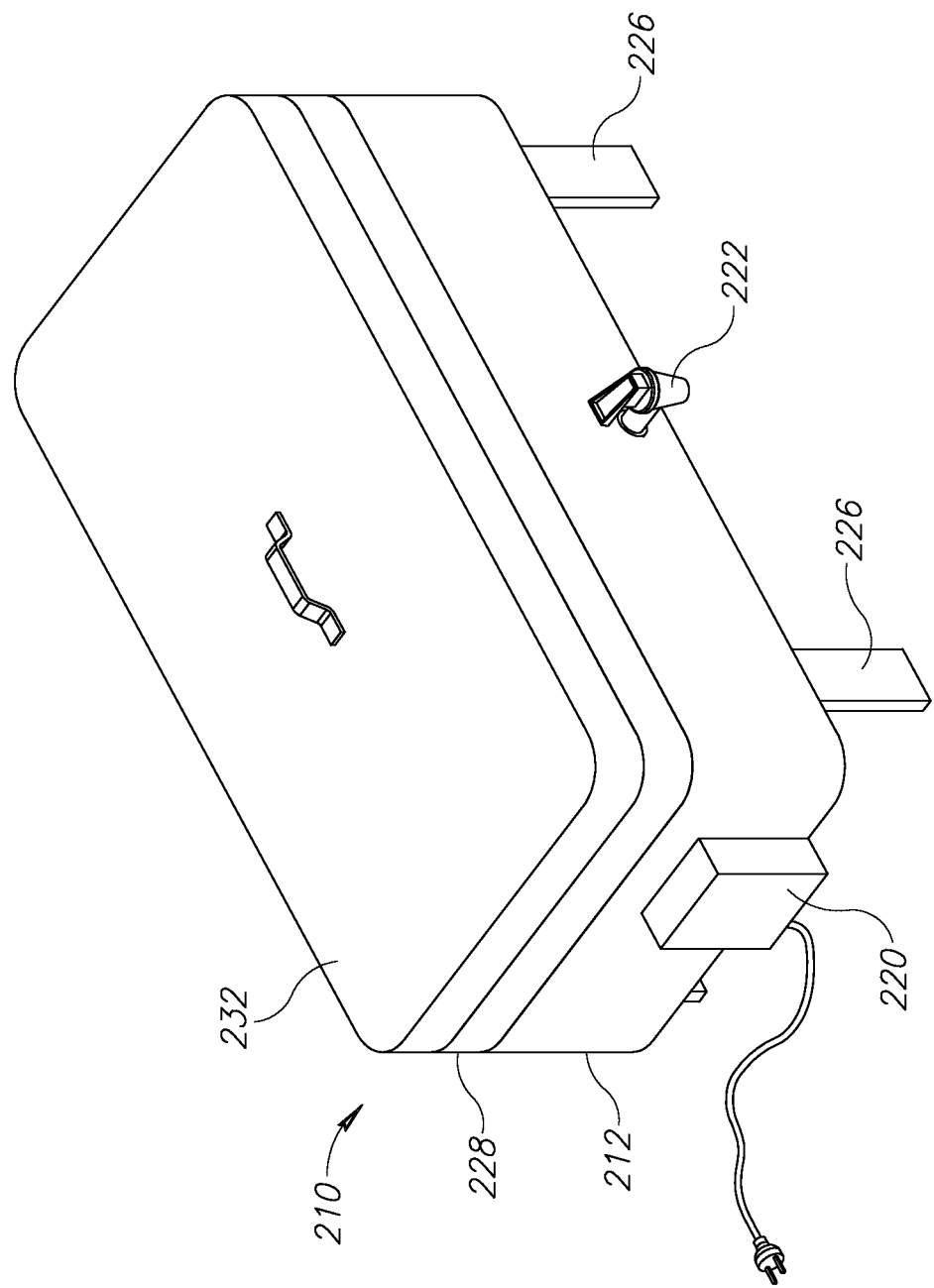
FIG. 2 is an isometric projection of the Combination Urn and Hot Plate provided with a cover for covering solid foods, in accordance with an embodiment of the present invention.

FIGS. 1 and 2 show a Combination Urn and Hot Plate in accordance with an embodiment of the present invention. Combination Urn and Hot Plate 10 is typically constructed from material suited to accommodate temperatures of up to 100° C. Typically, the Combination Urn and Hot Plate 10 is fabricated from a metal or alloy, and most typically from stainless steel. Urn 12 may be of any practical shape, but is typically rectangular. Typically, in order for the urn to be suitable for containing water, it will be watertight. The Combination Urn and Hot Plate 10 includes a liquid container 12 or urn section for heating up water, tea, coffee or other beverages therein. Urn 12 contains a heating coil 14 that is generally located near the bottom surface 16 thereof for supplying heat to a liquid within the container. The heating coil 14 is coupled to a power source, which may have a safety fuse 20. Optionally there may be a mechanism for monitoring and or controlling the temperature of the heating element, for example a temperature gauge and/or a thermostat. In certain embodiments, the mechanism for controlling the temperature may be located on the outer side wall 18 of the urn 12 such as in the power source 20. In this embodiment, power source 20 provides the electricity to heat coil 14. Electric power cord 21 is plugged into an electric socket to direct the electricity from the power source through the safety fuse 20 into the heating coil 14. Located on the outer portion 19 of urn 12 is a spigot 22. The user operates spigot 22 by applying pressure to lever 24, which allows the water contained within urn 12 to flow out. Spigot 22 is located on a side wall of the container 12, near the base thereof.

In some embodiments, the spigot attached to any urn of a device of the present invention is placed slightly above the water bottom, so the urn never empties completely. In other embodiments, the spigot is associated with an extended flexible hose to facilitate emptying of excess water.

In some embodiments, the Combination Urn and Hot Plate 10 is free-standing and includes a stand or legs for supporting the container at a convenient height. As illustrated, urn 12 can rest upon four identical legs 26. However, any suitable alternative type of stand falls within the scope of the present invention.

Hot plate 28 is a lid that covers the liquid container 12 and has a high coefficient of heat conductivity. Hot plate 28 is generally substantially the same shape as the urn 12. In certain embodiments, in order to be suitable for use as a food warming plate, the upper surface of the hot plate is substantially planar.

In certain embodiments, hot plate 28 is slightly larger than said urn in its planar dimensions, for example between 0.1-3 cm larger in each of the two planar dimensions, resulting in a slight overhang on each side when the hot plate 28 is centered on top of the urn portion 12. The hot plate 28 has four sidewalls 30 disposed about the periphery and extending downward to form a lip. The sidewalls 30 optionally fit over the upper edge 13 of urn 12 to moveably secure the hot plate to the urn 12. By removing the hot plate from the urn, water can be added to the urn. It is also within the scope of the invention for the planar dimensions of the hot plate 28 to be substantially the same dimensions as the urn; in this embodiment the hot plate 28 may be secured on top of the urn 12 by a different mechanism. In a non-limiting example, the upper edge 13 of the urn 12 may contain notches on the inner sides of each of its walls, with a corresponding lip in each of the four sidewalls 30 that fits into the notches.

A further cover 32, complete with a handle 34 may be provided for covering the hot plate 28. The cover 32 optionally has substantially the same shape as the hot plate 28. The cover 32 can optionally have a sidewall 33 extending downward in the form of a lip. In the illustration, the cover 32 has substantially the same planar dimensions as the hot plate; the outer edges of the sidewalls 33 of the cover are thus adapted to rest on the top of the hot plate 28. It is also within the scope of the invention for the cover 32 to have slightly larger planar dimensions than the hot plate; in this embodiment the sidewalls 33 fit over the upper edge of the hot plate 28. It is also within the scope of the invention to use the hot plate 28 without cover 32.

For operation, the user places a desired amount of water within the urn 12. The electric power cord 21 is placed into a wall socket and the temperature gauge, if provided, is set to the desired temperature. The heating coil 12 heats the water within the urn 12. The water may be dispensed through the spigot 22, e.g. by applying pressure to lever 24. Further, the hot water heats the hot plate 28. The user may place food atop hot plate 28 to warm it. If desired, the cover 32 may be placed on top of the hot plate 28 by the user.

Figure 3:
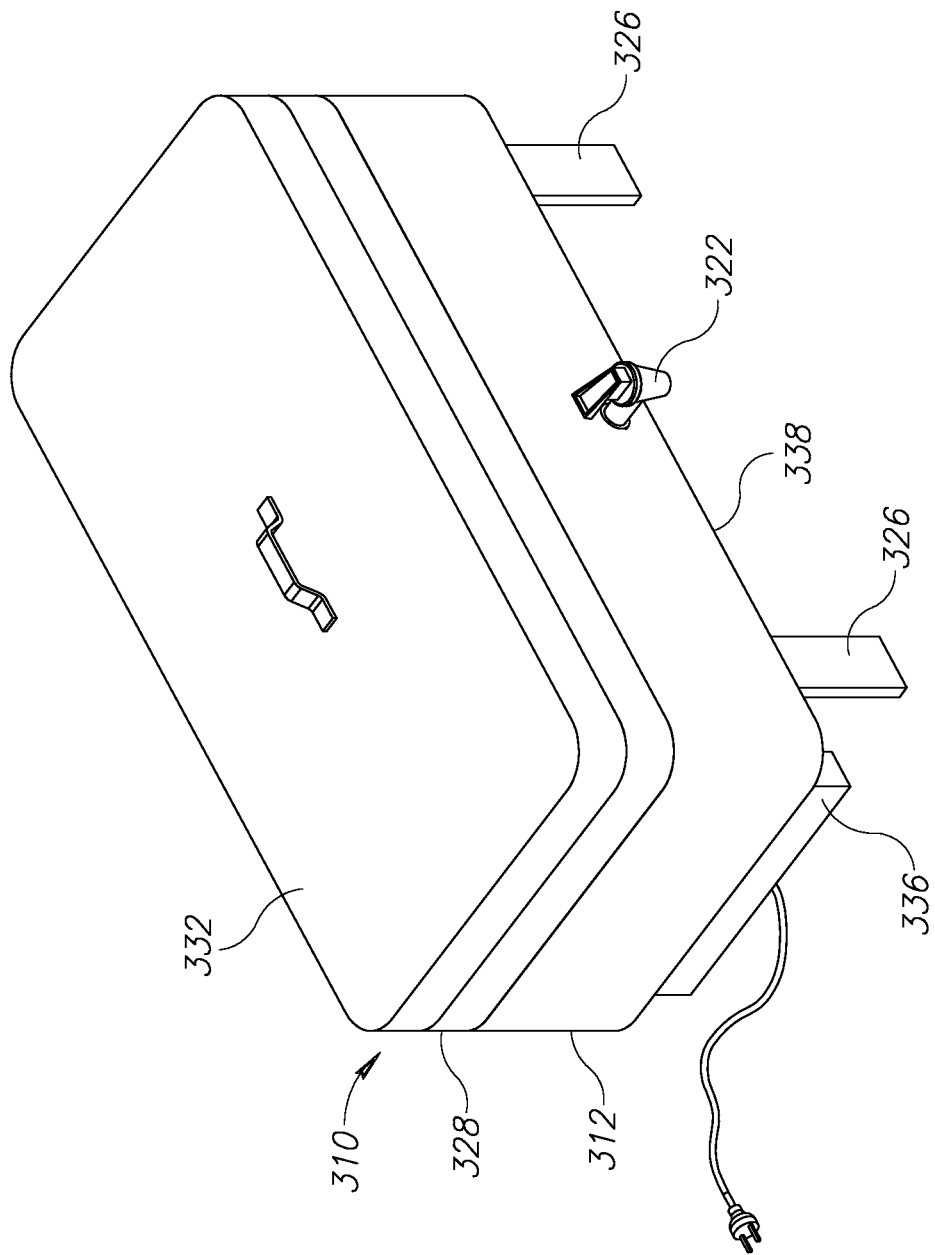
FIG. 3 is a front three-dimensional view of the Combination Urn and Warming/Heating Plate, with a heating element on the bottom of the urn, in accordance with an embodiment of the present invention.

FIG. 3 illustrates a front three-dimensional view of the Combination Urn and Hot Plate in accordance with certain embodiments of the present invention, with the cover 332 resting on the hot plate 328 and the hot plate 328 resting on the urn 312. The legs 326 and spigot 322 are also depicted. In this embodiment there is no heating coil located within urn 212. Rather, there is a heater 336 located on the outer surface (bottom side) of the bottom surface 338 of urn 312. The heater 336 heats the water within the urn 312 by transmitting heat by conduction of radiation through the bottom surface 338 of the urn. The thickness of the heater is exaggerated for illustrative purposes.

Figure 4:
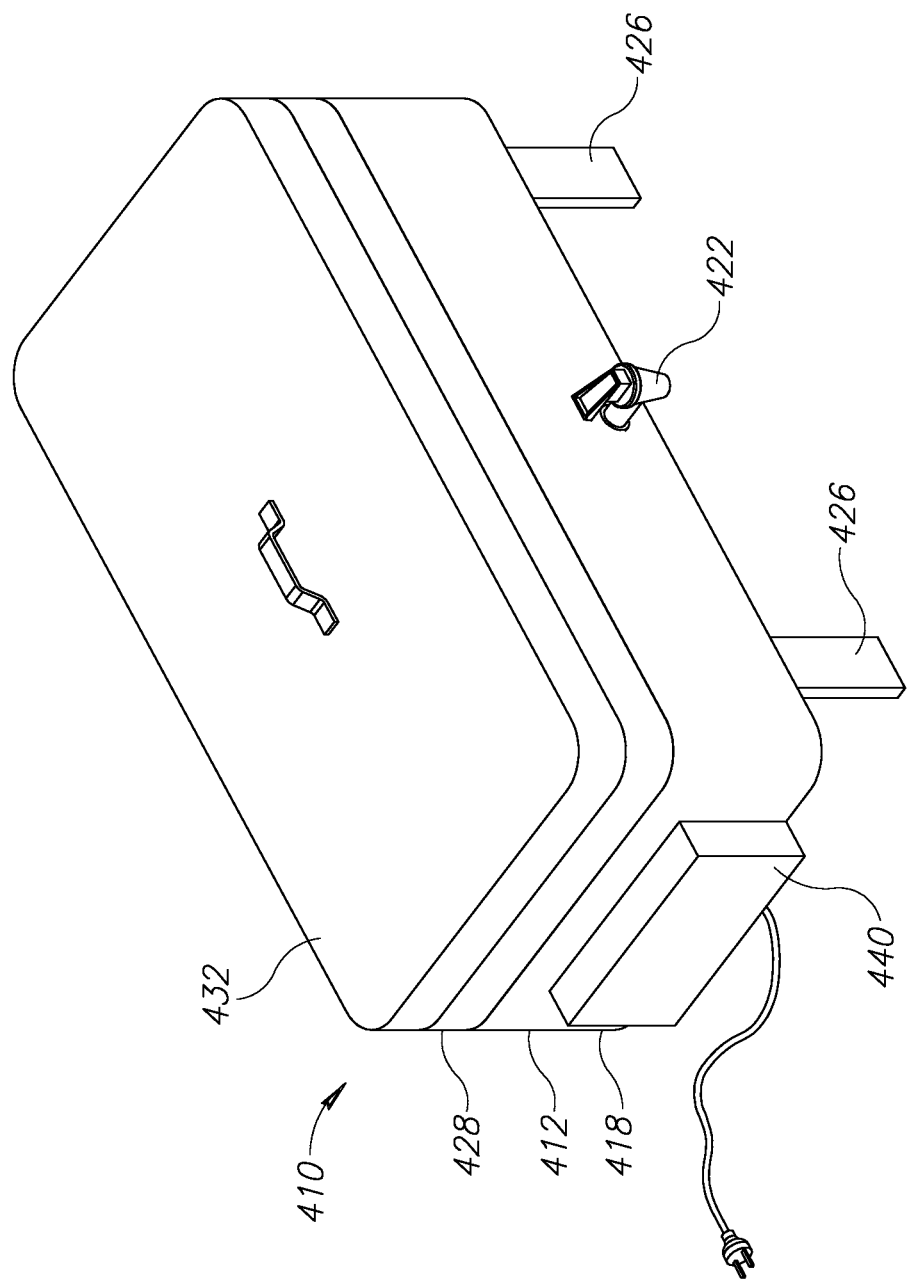
FIG. 4 is a front three-dimensional view of the Combination Urn and Warming/Heating Plate, with a heating element on the side of the urn, in accordance with an embodiment of the present invention.

FIG. 4 illustrates a front three-dimensional view of the Combination Urn and Hot Plate in accordance with a further embodiment of the present invention, with the cover 432 resting on the hot plate 428 and the hot plate 428 resting on the urn 412. Legs 426 and spigot 422 are also depicted, mutantis mutandis. In this embodiment there is no heating coil located within urn 412. Rather, there is a heater 440 located on the outer side wall 418 of the urn 412. The heater 440 heats the water within the urn 412 by transmitting heat through the outer side wall 418 of the urn. The thickness of the heater is exaggerated for illustrative purposes.

Figure 5:
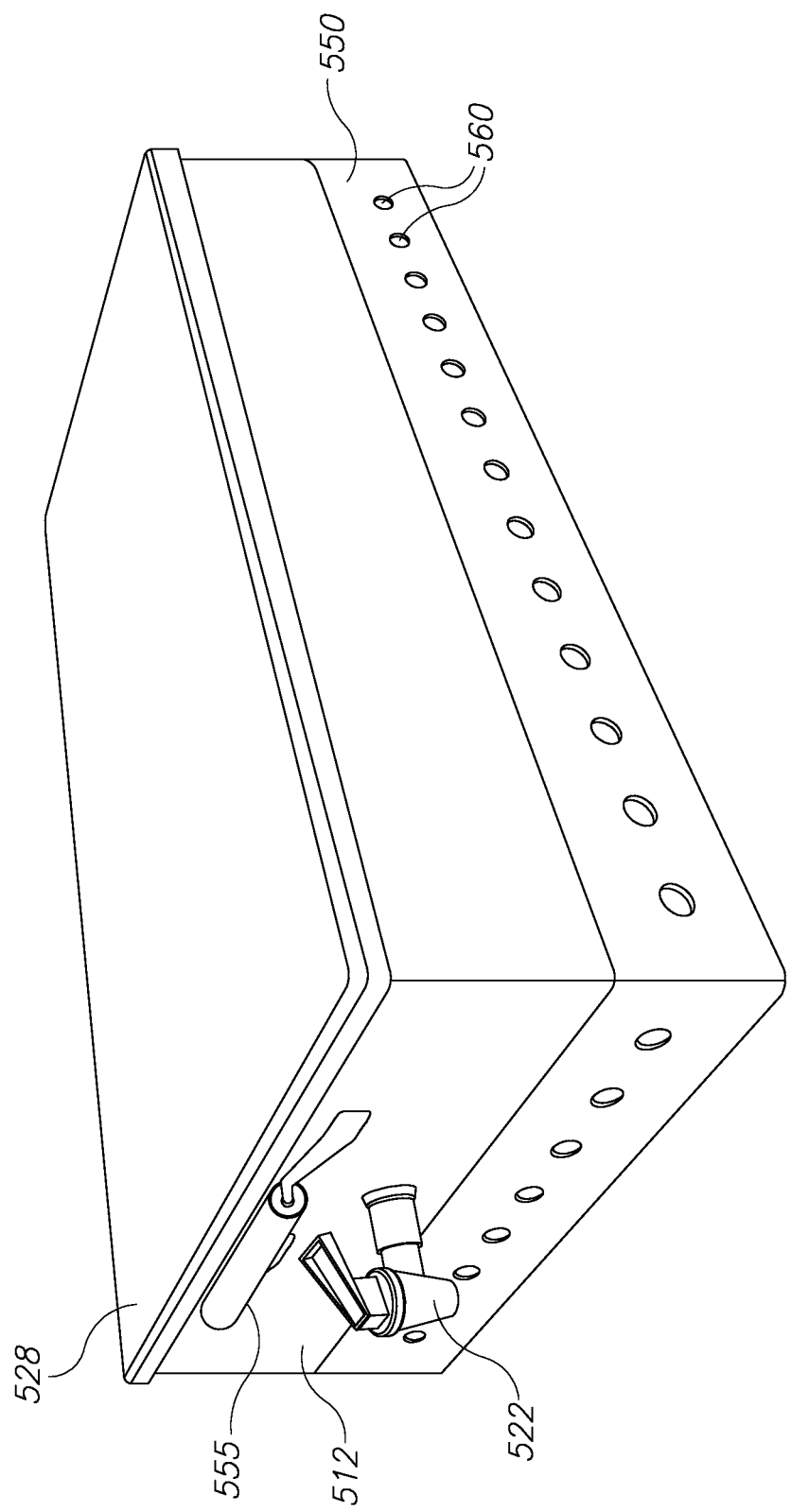
FIG. 5 is a front three-dimensional view of the Combination Urn and Warming/Heating Plate, with a heating element on the bottom of the urn and an apron surrounding the legs of the urn, in accordance with an embodiment of the present invention.

FIG. 5 illustrates a front three-dimensional view of the Combination Urn and Hot Plate, with the hot plate 528 resting on the urn 512 and no cover present. The spigot 522 is also depicted. Also present are handles for moving the urn while hot 555 and a heater (hidden) located on the bottom portion (hidden) of urn 512. Alternately, only one handle may be present; but two or more handles are preferred. There is also an apron-like structure 550 on three sides of the urn, which serves a dual function. It serves as legs, raising the urn off the ground and thus protecting an underlying table, work-surface or countertop from the heat that is generated as well as allowing easy access to the spigot. The apron-like structure 550 also prevents ready access to the heating element for safety reasons. As defined herein, an apron-like structure is a structure for raising an urn, comprising downward extensions of the sidewalls of the urn having a thickness and material composition enabling support of the urn when full. Optionally, the apron may have holes 560, preferably on all three of its sides, for heat ventilation, safety, or other purposes. The fourth side (hidden) lacks the apron and may be placed against the wall in proximity to a power outlet. Alternatively the apron may be present on all four sides of the urn. In another embodiment, the urn is supported by legs and further comprises an apron that surrounds the legs on at least three sides.

In some embodiments, the urn portion of a device of the present invention includes a water level indicator located on its exterior. In certain non-limiting embodiments, the water level indicator may be a transparent window. The use of any other suitable type of water level indicator falls within the scope of the present invention.

In certain other embodiments, the urn portion of a device of the present invention includes a maximum safe water level indicator, indicating the level to which the urn may be safely filled without the risk of overflow. In certain non-limiting embodiments, the maximum level indicator may be a groove etched into one or more of the urn's inner walls. The use of any other suitable type of maximum level indicator falls within the scope of the present invention.

In certain embodiments, a heater containing silicon rubber is utilized to heat the urn portion of a device of the present invention, and typically the silicon rubber heater is attached to the lower (outer) side of the bottom surface of the urn and heats the base by conduction or radiation for heating liquid therewithin by convection. Certain preferred embodiments of silicon rubber heater utilized in devices and method of the present invention comprise wire-wound or etched foil heating elements that are protected by fiberglass-reinforced silicon rubber. Optionally, the heater may be attached to the urn wall using non-reusable pressure sensitive adhesive. In other embodiments, the heating element may be laminated by thin a layer or layers of high temperature insulation material on the surfaces not contacting the urn. In still other embodiments, the heater is grounded. In some embodiments, the heating element may include a thermostat. In other embodiments, no thermostat is present in the heating element.

A prototype of a device of the present invention has been produced using a silicone rubber/foil heater provided by Electro-Flex Heat, Inc. (Bloomfield, Conn., USA) and having a thickness of 0.04 inches (1.0 mm), placed on the outer surface of the bottom side of the urn. The device saved both space and electricity, relative to having both an urn and a hot plate. In addition, it was discovered that when water was kept in the urn and the heater was activated, the food placed onto the hot plate could be kept hot for an extended period without burning. Further, the food remained moist.

Other embodiments of the present invention provide a method for providing hot water and heat food, said method comprising the steps of (a) placing said water in an urn, wherein said urn comprises an interior space suitable for containing water, a cover of said interior space, a means for removing water from said interior space without moving said urn, and a heating element; and said cover of said interior space is suitable for use as a food heating plate; and (b) placing said food on said cover of said interior space.

In the claims, the word "comprise", and variations thereof such as "comprises", "comprising", and the like indicate that the components listed are included, but not generally to the exclusion of other components.

The invention claimed is:

1. A method for using a device indicated for heating and for maintaining beverage and food at an elevated temperature, the device including: an urn with a spigot, a plate including a surface for food, wherein the plate is a lid of the urn, and a heating element attached to the urn, the method comprising:

removing the plate from the urn to allow placing of the beverage within the urn; wherein the beverage is heated by the heater and the heated beverage heats the plate, wherein the plate includes a plurality of side walls disposed about the periphery of the surface and extend downwards to form a lip, wherein the side walls fit over the urn to removably secure the plate to the urn;

placing food for heating on the surface of the plate;

dispensing the beverage through the spigot to serve the beverage.

2. The method of claim 1, wherein the device further includes a handle connected to the urn, the method further comprising:
   moving the device using the handle.

3. The method of claim 1, the method further comprising:
   controlling the temperature of the beverage inside the urn.

4. The method of claim 1, the method further comprising:
placing over the food a cover of substantially the same planar dimensions as the surface of the place.

\* \* \* \* \*